(12) United States Patent
Yao et al.

(10) Patent No.: US 9,703,426 B2
(45) Date of Patent: Jul. 11, 2017

(54) TOUCH PATTERN STRUCTURE OF IN-CELL CAPACITIVE TOUCH SCREEN

(71) Applicant: Shanghai Tianma Micro-Electronics Co., Ltd., Shanghai (CN)

(72) Inventors: Qijun Yao, Shanghai (CN); Lihua Wang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 109 days.

(21) Appl. No.: 14/084,546

(22) Filed: Nov. 19, 2013

(65) Prior Publication Data

US 2014/0078106 A1 Mar. 20, 2014

Related U.S. Application Data

(63) Continuation of application No. PCT/CN2012/084665, filed on Nov. 15, 2012.

(30) Foreign Application Priority Data

Jul. 27, 2012 (CN) .......................... 2012 1 0265067

(51) Int. Cl.
   *G06F 3/041* (2006.01)
   *G06F 3/044* (2006.01)

(52) U.S. Cl.
   CPC .................................... *G06F 3/044* (2013.01)

(58) Field of Classification Search
   CPC .. G06F 2203/04111; G06F 2203/04112; G06F 3/044

USPC .......................................................... 345/174
See application file for complete search history.

(56) References Cited

U.S. PATENT DOCUMENTS

| 6,297,811 | B1 | 10/2001 | Kent et al. |
| 9,128,571 | B2 * | 9/2015 | Moyal ..................... G06F 3/044 |
| 9,312,048 | B2 * | 4/2016 | Ichiki ....................... G06F 3/044 |
| 2007/0229470 | A1 | 10/2007 | Snyder et al. |
| 2009/0194344 | A1 * | 8/2009 | Harley .................... G06F 3/044 |
| | | | 178/18.06 |

(Continued)

FOREIGN PATENT DOCUMENTS

| CN | 201336029 Y | 10/2009 |
| CN | 101907963 | 12/2010 |

(Continued)

OTHER PUBLICATIONS

Extended European Search Report for European Application No. 12876083.2, mailed on Feb. 11, 2015, 5 pages total.

(Continued)

*Primary Examiner* — Jonathan Boyd
(74) *Attorney, Agent, or Firm* — Alston & Bird LLP (57) ABSTRACT

A touch pattern structure of an in-cell capacitive touch screen is disclosed. The touch pattern structure includes a plurality of driving lines in a first direction, the plurality of driving lines being insulated from each other, and a plurality of sensing lines in a second direction, the plurality of sensing lines being insulated from each other. The first direction intersects with the second direction, the driving lines are respectively insulated from the sensing lines, and a mutually-embedded structure is provided on at least a part of opposing sides of the driving lines and the sensing lines.

13 Claims, 3 Drawing Sheets

(56) References Cited

U.S. PATENT DOCUMENTS

| | | |
|---|---|---|
| 2010/0026664 A1 | 2/2010 | Geaghan |
| 2010/0110038 A1 | 5/2010 | Mo et al. |
| 2010/0194697 A1 | 8/2010 | Hotelling et al. |
| 2010/0214247 A1* | 8/2010 | Tang .................. G06F 3/044 345/173 |
| 2010/0302201 A1* | 12/2010 | Ritter et al. .................. 345/174 |
| 2012/0153970 A1 | 6/2012 | Mignard et al. |

FOREIGN PATENT DOCUMENTS

| | | |
|---|---|---|
| CN | 102221755 A | 10/2011 |
| CN | 102236187 A | 11/2011 |
| CN | 102253782 A | 11/2011 |
| CN | 102360260 A | 2/2012 |
| CN | 102541334 A1 | 7/2012 |
| EP | 2315108 A1 | 4/2011 |

OTHER PUBLICATIONS

Office Action cited in corresponding Chinese Application No. 201210265067.9, dated Aug. 18, 2015.

* cited by examiner

TOUCH PATTERN STRUCTURE OF IN-CELL CAPACITIVE TOUCH SCREEN

CROSS-REFERENCES TO RELATED APPLICATIONS

The application claims priority to and is a continuation of PCT/CN2012/084665, filed on Nov. 15, 2012 and entitled "TOUCH PATTERN STRUCTURE OF IN-CELL CAPACITIVE TOUCH SCREEN", which application claims the priority of Chinese patent application No. 201210265067.9, titled "TOUCH PATTERN STRUCTURE OF IN-CELL CAPACITIVE TOUCH SCREEN" and filed with the Chinese Patent Office on Jul. 27, 2012, the contents of which are incorporated herein by reference in their entirety.

FIELD OF THE INVENTION

The invention relates to the field of touch, and in particular to a touch pattern structure of in-cell capacitive touch screen.

BACKGROUND OF THE INVENTION

Since the earliest resistive touch screen has been appeared in 1974, the touch technology develops rapidly; and at present, products with various touch principles, such as a capacitive touch screen, a resistive touch screen, an infrared touch screen, and an acoustic touch screen, have been developed in the industry. The capacitive touch screen is predominant in the current market due to its advantages of accurate and sensitive positioning, good touch feeling, long service life and multi-touch supportable.

The capacitive touch screen can be classified into self-capacitance and mutual-capacitance according to different work principles. Since the mutual-capacitance touch screen can achieve the multi-touch function, the mutual-capacitance touch screen becomes the mainstream and the developing trend of the capacitive touch screen market.

Presently, the majority of the mutual-capacitance touch screen employs the on-cell structure. Namely, the touch screen panel is attached on the exterior of the display panel. For this on-cell structure, the thickness and the weight of the whole display is inevitably increased, further reducing the light transmittance. Thus, the conventional on-cell structure does not conform to the requirement for developing trend of a thinner and lighter display.

Consequently, an in-cell capacitive touch screen is proposed, i.e., the capacitive touch screen pattern is integrated inside the display panel.

However, compared with the on-cell capacitive touch screen, in the in-cell capacitive touch screen, the distance between the electrode layer of the display panel and the electrode layer of a touch screen is closer, and thus the signal interference therebetween is more severe, such that the sensitivity of the touch screen is reduced. Consequently, the touch screen pattern structure of the conventional on-cell capacitive touch screen (the conventional touch screen pattern structure is generally formed of polygonal electrodes with straight sides) can not satisfy the requirement of touch sensitivity.

BRIEF SUMMARY OF THE INVENTION

Another inventive aspect is a touch pattern structure of an in-cell capacitive touch screen, including a plurality of driving lines in a first direction, the plurality of driving lines being insulated from each other, and a plurality of sensing lines in a second direction, the plurality of sensing lines being insulated from each other, where the first direction intersects with the second direction, where the driving lines are respectively insulated from the sensing lines, and where a mutually-embedded structure is provided on at least a part of opposing sides of the driving lines and the sensing lines.

DETAILED DESCRIPTION OF THE INVENTION

Figure 1:
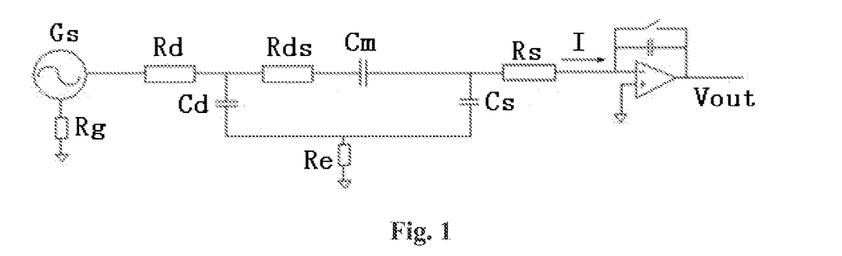
FIG. 1 is a schematic diagram of a work principle model of a mutual-capacitance touch pattern structure.

Referring to FIG. 1, FIG. 1 is a schematic diagram of a work principle model of a mutual-capacitance touch pattern structure. In FIG. 1, Gs represents a touch scanning signal generation device, which has one resistor Rg to ground and emits a scanning signal in a certain frequency. Rd represents an equivalent resistor of a driving electrode, Rs represents an equivalent resistor of a sensing electrode, a capacitive reactance may be formed between the driving electrode and the sensing electrode, an equivalent resistor of the capacitive reactor is Rds. A mutual-capacitance Cm is formed between the driving electrode and the sensing electrode, the mutual-capacitance touch screen achieves the touch function by utilizing the mutual-capacitance. When a touch action occurs between the driving electrode and the sensing electrode, the mutual-capacitance Cm will vary, so as to form a coupling current I. The coupling current I is amplified by a comparison amplifier, so as to output the touch signal with a voltage output signal Vout.

Referring to FIG. 1, the driving electrode also has a coupling capacitance to ground (also referred to as a self-capacitance or a parasitic capacitance) Cd. The sensing electrode also has a coupling capacitance to ground (also referred to as a self-capacitance or a parasitic capacitance) Cs. It is found by the inventor that, when the conventional touch electrode pattern (such as a rhombus with straight sides) is integrated in the in-cell touch panel structure, Cd and Cs may be much greater than the mutual-capacitance Cm for touch detection. Meanwhile, the resistance of an equivalent resistor Re of the capacitive reactance to ground of the two capacitances Cd and Cs is relatively great. In this case, the coupling current I between the driving electrode and the sensing electrode is proportional to the product of Cd and Cs. Since Cd is proportional to the area Sd of the driving electrode and Cs is proportional to the area Ss of the sensing electrode, the coupling current I is proportional to the product of Sd and Ss. In addition, it is found by the inventors that, since the driving electrode and the sensing electrode are formed by etching the same electrode material layer, and the driving electrode is isolated from the sensing electrode by only an etching groove, therefore the driving electrode and the sensing electrode have opposing sides with the same length. The length of the opposing sides may be indicated by L. The mutual-capacitance Cm between the driving electrode and the sensing electrode is proportional to the length L of the opposing sides.

It is concluded by the inventor that, the value of the coupling capacitance to ground Cd of the driving electrode is proportional to the area of the driving electrode, and the value of the coupling capacitance to ground Cs of the sensing electrode is proportional to the area of the sensing electrode. If Cd and Cs are to be reduced, the area Sd of the driving electrode and the area Ss of the sensing electrode should be reduced correspondingly. The mutual capacitance Cm between the driving electrode and the sensing electrode is proportional to the length L of the opposing sides between the driving electrode and the sensing electrode. If the mutual capacitance Cm between the driving electrode and the sensing electrode is to be increased, the length L should be increased correspondingly. Consequently, in order to reduce the coupling capacitance to ground Cd and the coupling capacitance to ground Cs and additionally increase the mutual-capacitance Cm between the driving electrode and the sensing electrode, the value of (Sd×Ss)/L should be reduced. Once the value of (Sd×Ss)/L is reduced, the signal-noise ratio of the touch signal can be improved, thus the touch sensitivity of the touch electrode pattern can be improved, so that the touch sensitivity requirement of the in-cell touch panel structure is satisfied.

Therefore, a touch pattern structure of an in-cell capacitive touch screen is proposed by the inventor to improve the signal-noise ratio of the touch pattern structure and improve the touch sensitivity.

First Embodiment

Figure 2:
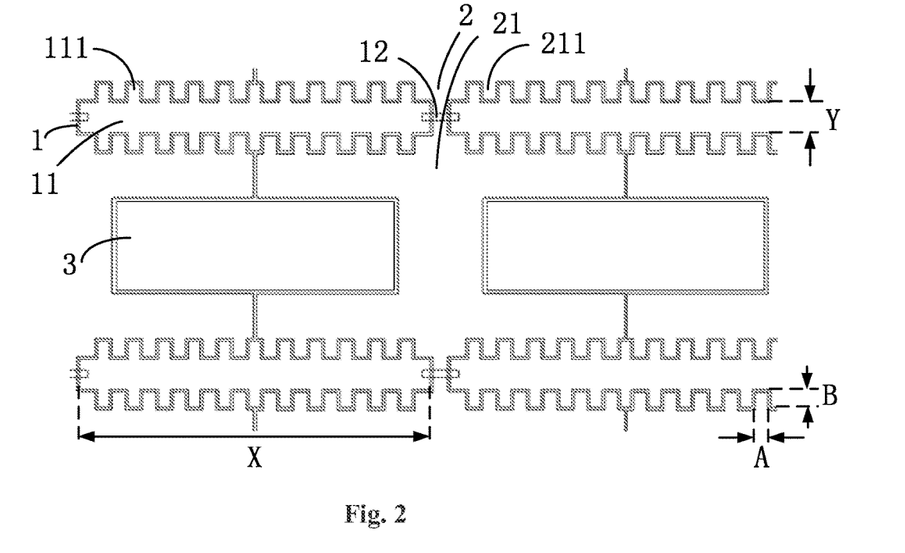
FIG. 2 is a schematic diagram of a touch pattern structure of an in-cell capacitive touch screen provided by a first embodiment of the invention.

Referring to FIG. 2, FIG. 2 is a schematic diagram of a touch pattern structure of an in-cell capacitive touch screen provided by the first embodiment of the invention. It can be seen from FIG. 2 that, the touch pattern structure of the in-cell capacitive touch screen includes multiple driving lines 2 in a first direction and being insulated from each other. Each driving line 2 includes multiple driving electrodes 21, the overall geometry of driving electrodes is a character "H" substantially, and adjacent driving electrodes 21 are electrically connected with each other. The touch pattern structure of the in-cell capacitive touch screen also includes multiple sensing lines 1 in a second direction and being insulated from each other. Each sensing line 1 includes multiple sensing electrodes 11 and conducting wires 12 connecting adjacent sensing electrodes 11. Furthermore, there is an etching groove between the driving lines 2 and the sensing lines 1, such that the driving lines 2 are insulated from the sensing lines 1. In addition, although it is not shown in FIG. 2, both the driving lines 2 and the sensing lines 1 are connected to a touch controller.

It should be noted that, in the embodiment, the first direction is perpendicular to the second direction, i.e., the driving line 2 is perpendicular to the sensing line 1. But in other embodiments, the driving line 2 may be not perpendicular to the sensing line 1, which may intersect with the sensing line 1 at a certain angle.

It should be noted that, the number of conducting wire 12 may not be limited as single or multiple. The structure of each conducting wire may not be limited as single-layer or multi-layer. The material for manufacturing the conducting wire 12 may be metal, conductive metal oxide or a combination thereof, which further can be the same as the material for manufacturing the sensing electrode 11.

Referring to FIG. 2 again, the rectangular teeth with same shape are formed on the opposing sides of the driving electrode 21 and the sensing electrode 11. A rectangular tooth on the driving electrode 21 is indicated by 211, and a rectangular tooth on the sensing electrode 11 is indicated by 111. Due to the rectangular teeth on the opposing sides, a mutually-embedded or mutually-protruding structure is formed between the opposing sides of the driving electrode 21 and the sensing electrode 11.

In the embodiment, the tooth of the sensing electrode 11 is a substantially rectangular tooth 111 having somewhat rounded corners. However, in other embodiments, the geometry of the tooth may be designed as triangular, branch-shape, wave-shape or the like. The teeth of the driving electrode 12 match with the teeth of the sensing electrode 11 respectively.

In the embodiment, the electrode body (the electrode body refers to a part of the electrode that does not contain the tooth) of the sensing electrode 11 is in a shape of a rectangular. In other embodiments, the electrode body of the sensing electrode 11 can also in a shape of a rhombus, a rectangle, a hexagon or a branch.

Referring to FIG. 2 again, the length of the electrode body of the sensing electrode 11 is indicated by X and the width thereof is indicated by Y. The resistance value of the electrode is determined according to the width of Y. In order to ensure that the resistance of the sensing electrode 11 is small enough to satisfy the signal transmission requirement, Y should be greater than a certain value, and the certain value depends on the material of the electrode.

Referring to FIG. 2 again, the length of the bottom side of the rectangular tooth 111 on the sensing electrode 11 is indicated by A and the height thereof is indicated by B. The area of the sensing electrode 11 is indicated by Ss, the area of the driving electrode 21 is indicated by Sd, and the length of the opposing sides of the driving electrode 21 and the sensing electrode 11 is indicated by L. By research, the inventors have found that, if Y≥2A and the number of the teeth on each sensing electrode 11 is above L(Y−2A)/AB, the value of (Sd×Ss)/L between the driving electrode 21 and the sensing electrode 11 with the tooth engagement structure is reduced to a small value, which satisfies the touch sensitivity requirement of the in-cell capacitive touch screen.

In the embodiment, in the case that twelve rectangular teeth 111 is provided on each side of the sensing electrode 11, if A=2 mm and B=3 mm, L=(2+3×2)×12=96 mm. In the case that there is no tooth engagement structure, L=2×12=24 mm. It can be concluded that, when the tooth engagement structure is provided, the value of L is 4 times longer than the value of L when no tooth engagement structure is provided, while the values of Sd and Ss almost keep constantly. Thus, when there are the rectangular tooth 111 and the rectangular tooth 211, the value of (Sd×Ss)/L is one-fourth of the value of (Sd×Ss)/L when there are no rectangular tooth 111 and the rectangular tooth 211. Thereby, the touch sensitivity is significantly improved by disposing the rectangular tooth 111 and the rectangular tooth 211.

Referring to FIG. 2 again, besides the driving lines 2 and the sensing lines 1, the touch pattern structure provided by the embodiment also includes a virtual electrode 3. In the present embodiment, the geometry of the virtual electrode is rectangle, and is formed between two adjacent driving electrodes 21. Due to the virtual electrode 3, the area of the driving electrode 21 and the area of the sensing electrode 11 themselves are reduced, and thus the self-capacitance of the driving electrode 21 or the sensing electrode 11 is reduced, further improving the touch sensitivity correspondingly. Meanwhile, the driving electrode 21 and the sensing electrode 11 may not be easily to be perceived by human eyes because of the virtual electrode 3, the pattern of the whole touch pattern structure is more uniform, and the visual effect of the touch pattern is better.

Figure 3:
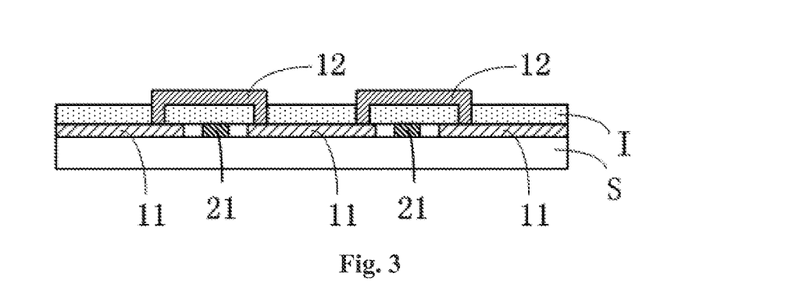
FIG. 3 is a schematic diagram of a first embodiment of the cross section of the touch pattern structure provided by FIG. 2.

Referring to FIG. 3, FIG. 3 is a schematic diagram of a first embodiment of the cross section of the touch pattern structure provided by FIG. 2. In the touch pattern structure provided by the present embodiment, the driving electrode 21 and the sensing electrode 11 are formed on the same surface of a substrate S. It can also be seen from FIG. 3 that, the driving electrode 11 and the sensing electrode 11 are covered by an insulating layer I. In the present embodiment, the insulating layer I includes through holes. The conducting wire 12 crosses the insulating layer I, and connects the two adjacent sensing electrodes 11 through the through holes in the insulating layer I to form the sensing line 1 in FIG. 2. At this time, on the surface of the substrate S provided with the driving electrode 21 and the sensing electrode 11, other regions except a region provided with the driving electrode 21 and the sensing electrode 11 are covered by the virtual electrode (it is not shown in FIG. 3, this is because the cross section does not intersect the virtual electrode, but this structure can be understood by referring to FIG. 2), i.e., the virtual electrode is located between the driving electrode 21 and the sensing electrode 11.

Figure 4:
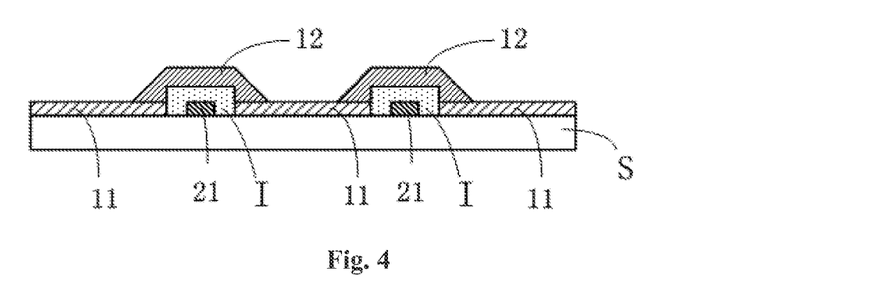
FIG. 4 is a schematic diagram of a second embodiment of the cross section of the touch pattern structure provided by FIG. 2.

Referring to FIG. 4, FIG. 4 is a schematic diagram of a second embodiment of the cross section of the touch pattern structure provided by FIG. 2. Similar to the structure in FIG. 3, in the touch pattern structure provided by the present embodiment, the driving electrode 21 and the sensing electrode 11 are formed on the same surface of a substrate S. However, in the present embodiment, the insulating layer I partly covers the driving electrode 21, and there is no through hole in the insulating layer I. The conducting wire 12 crosses the insulating layer I to connect two adjacent sensing electrodes 11 to form the sensing line 1 in FIG. 2. Also, on the surface of the substrate S provided with the driving electrode 21 and the sensing electrode 11, other regions except a region provided with the driving electrode 21 and the sensing electrode 11 are covered by the virtual electrode (it is not shown in FIG. 4, this is because the cross section does not intersect the virtual electrode, but the structure can be understood by referring to FIG. 2).

Figure 5:
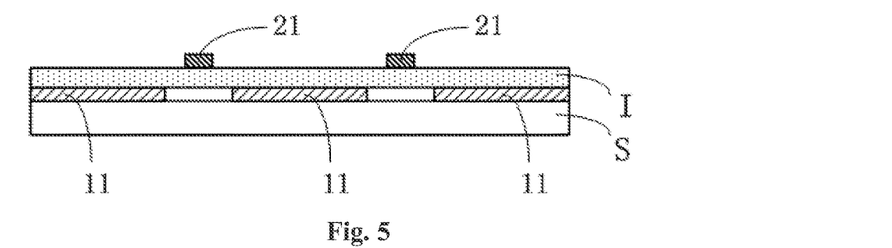
FIG. 5 is a schematic diagram of a third embodiment of the cross section of the touch pattern structure provided by FIG. 2.

Referring to FIG. 5, FIG. 5 is a schematic diagram of a third embodiment of the cross section of the touch pattern structure provided by FIG. 2. Similar to the structure in FIG. 3 and FIG. 4, in the touch pattern structure provided by the present embodiment, the driving electrode 21 and the sensing electrode 11 are formed on the same surface of a substrate S. However, a difference is that: in the present embodiment, the driving electrode 21 and the sensing electrode 11 are respectively located on two sides of the insulating layer I. Namely, the sensing electrode 11 is located on the lower side of the insulating layer I, and the driving electrode 21 is located on the upper side of the insulating layer I. Other regions on the two sides of the insulating layer I except a region which is covered by the driving electrode 21 and the sensing electrode 11, are covered by the virtual electrode (it is not shown in FIG. 5, this is because the cross section does not intersect the virtual electrode, but the structure can be understood by referring to FIG. 2).

It should be noted that, the substrate S described above is an insulating substrate. Further, the substrate S may be a color film substrate or an array substrate in a liquid crystal panel; or it may also be an insulting substrate in OLED. The touch pattern is integrated in the liquid crystal panel or the OLED to form the in-cell capacitive touch screen.

It should be noted that, in other embodiments, the geometry of virtual electrode may be designed as other shapes, such as a polygon, a circle or an oval, or may be an integral pattern filled in a region of the insulating layer while no driving lines and the sensing lines are disposed in that region.

Second Embodiment

Figure 6:
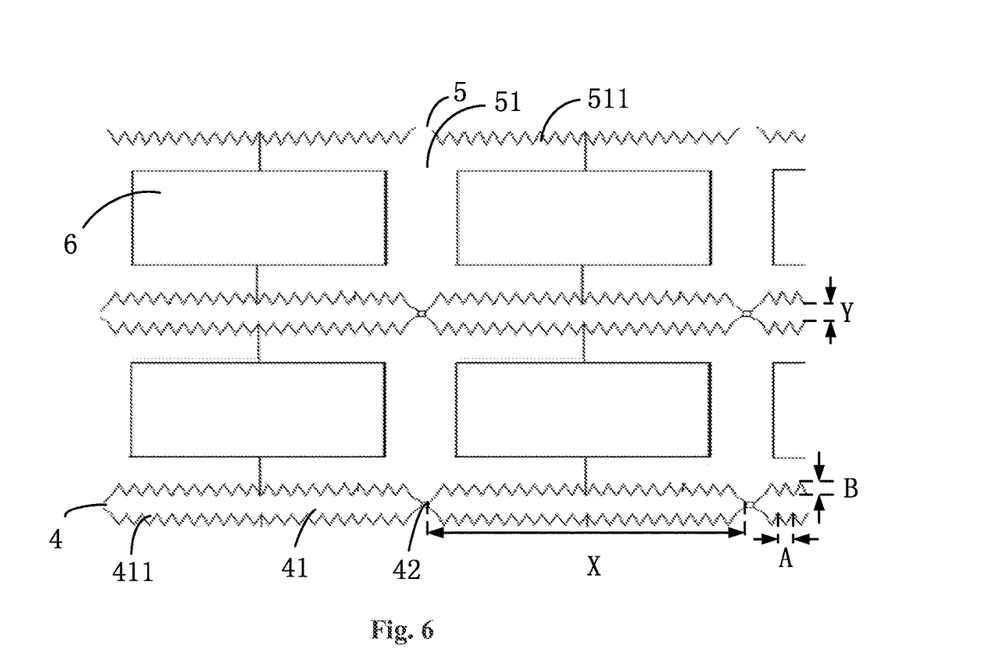
FIG. 6 is a schematic diagram of a touch pattern structure of an in-cell capacitive touch screen provided by a second embodiment of the invention.

Referring to FIG. 6, FIG. 6 is a schematic diagram of a touch pattern structure of an in-cell capacitive touch screen provided by a second embodiment of the invention. It can be seen from FIG. 6 that, the touch pattern structure of the in-cell capacitive touch screen includes multiple driving line 5 in a first direction and being insulated from each other. The driving line 5 includes multiple driving electrodes 51, the overall geometry of driving electrodes is a character "H" substantially. In the present embodiment, adjacent driving electrodes 51 are electrically connected with each other, such that all of the driving electrodes 51 are integral (i.e., the driving line 5). The touch pattern structure of the in-cell capacitive touch screen also includes multiple sensing lines 4 in a second direction and being insulated from each other. The sensing line 4 includes multiple sensing electrodes 41, and adjacent sensing electrodes 4 are connected by a conducting wire 42. The driving lines 5 are insulated from the sensing lines 4. Although it is not shown in FIG. 3, both the driving lines 5 and the sensing lines 4 are connected to a touch controller.

Referring to FIG. 6 again, triangular teeth are formed on the opposing sides of the driving electrode 51 and the sensing electrode 41. The triangular tooth of the driving electrode 51 is indicated by 511, and the triangular tooth of the sensing electrode 41 is indicated by 411. The triangular tooth 511 engages the triangular tooth 411 to form a tooth engagement structure (i.e., a mutually-embedded structure). The triangular tooth has a feature that its width increases gradually from its tip to its bottom connected with the electrode body, which is beneficial to detect the mutual-capacitance signal.

In the embodiment, the length of the electrode body of the sensing electrode 41 is indicated by X and the height thereof is indicated by Y. The length of the bottom side of the triangular tooth 411 on the sensing electrode 41 is indicated by A and the height thereof is indicated by B. The area of each sensing electrode 41 is Ss=(Y+B)X. It can be known according to the Pythagorean Theorem that, the length of one side of the triangular tooth 411 or 511 is $[B^2+(X/N)^2]^{1/2}$, where N is the number of the teeth. Therefore, the length of the opposing sides of the driving electrode 51 and the sensing electrode 41 is $L=[B^2+(X/N)^2]^{1/2} \times 2N$ (this equation corresponds to a case that each sensing electrode 41 has one corresponding opposing side for each of two driving electrode 51, as shown in FIG. 6). The greater the N is, the longer the L is, but the value of Ss substantially keeps constantly. Consequently, within the allowable etching accuracy, the more the teeth is, the better. In addition, the electrode area of the driving electrode 51 is Sd, the length of the opposing sides of the driving electrode 51 and the sensing electrode 41 is $L=2(A^2/4+B^2)^{1/2}$. There is an extremum value for the ratio (Sd×Ss)/L. If A=0.2 mm and Y=0.4 mm, then the optimal value of B is approximately 0.8 mm. At this time, when there is the tooth, the value of (Sd×Ss)/L is half of the value of (Sd×Ss)/L when there is no tooth. In this way, the touch sensitivity of the touch pattern is improved significantly.

Referring to FIG. 6 again, besides the driving line 5 and the sensing line 4, the touch pattern structure provided by the present embodiment also includes a virtual electrode 6. In the present embodiment, the virtual electrode 6 is in a shape of a rectangle, and is formed between two adjacent driving electrodes 51. Due to the virtual electrode 6, the area of the driving electrode 51 and the sensing electrode 41 themselves are reduced, and thus the self-capacitance of the driving electrode 51 or the sensing electrode 41 is reduced, further improving the touch sensitivity correspondingly. Meanwhile, the driving electrode 51 and the sensing electrode 41 may not be easily to be perceived by human eyes because of the virtual electrode 6, the pattern of the whole touch pattern structure is more uniform, and the visual effect of the touch pattern is better.

In other embodiments of the invention, the triangular tooth 411 or 511 can be designed as a right-angled triangle tooth. The manufacturing of the right-angled triangle tooth is easier, which facilitates the manufacturing of the touch pattern.

Similar to the first embodiment of the invention, in the touch electrode pattern structure provided by the embodiment, the driving line 5 and the sensing line 4 can be located on the same side or different sides of the same insulating layer. Alternatively, even the driving line 5 and the sensing line 4 can be located in different insulating layers. In any cases, the corresponding virtual electrode can be arranged between the driving line 5 and the sensing line 4 at a corresponding suitable position, thereby reducing the self-capacitance of the electrode by reducing the area of the electrode.

Third Embodiment

Figure 7:
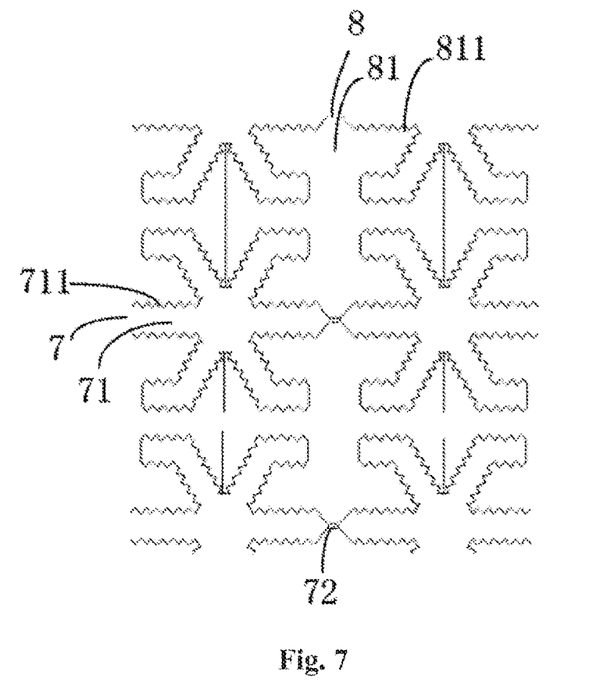
FIG. 7 is a schematic diagram of a touch pattern structure of an in-cell capacitive touch screen provided by a third embodiment of the invention.

Referring to FIG. 7, FIG. 7 is a schematic diagram of a touch pattern structure of an in-cell capacitive touch screen provided by the third embodiment of the invention. It can be seen from FIG. 7 that, the touch pattern structure of the in-cell capacitive touch screen includes multiple driving lines 8 in a first direction and being insulated from each other. Each driving line 8 includes multiple driving electrodes 81, the overall geometry of driving electrodes 81 is similar to the Chinese character "王". In the present embodiment, adjacent driving electrodes 81 are electrically connected with each other such that the driving electrodes 81 are integral (i.e., the driving line 8). The touch pattern structure of the in-cell capacitive touch screen also includes multiple sensing lines 7 in a second direction and being insulated from each other. Each sensing line 7 includes multiple sensing electrodes 71, and adjacent sensing electrodes 7 are connected by a conducting wire 72. The driving lines 8 and the sensing lines 7 are respectively insulated from each other. Although it is not shown in FIG. 7, both the driving lines 8 and the sensing lines 7 are connected to a touch controller.

Referring to FIG. 7, the electrode body of the sensing electrode 71 is in a shape of a branch, and each sensing electrode 71 has 6 branches. In the embodiment, the width of each electrode branch is above 0.2 mm. The branch-shaped sensing electrode 71 is provided with multiple teeth 711 in each branch. Also, the driving electrode 81 is provided with teeth 811 matching with the teeth 711.

In the present embodiment, at least one direct side or curved side of each branch of the sensing electrode 71 is provided with more than three teeth 711. In the present embodiment, the geometry of tooth 711 may be designed as substantially rectangular or triangular. In other embodiments, the geometry of tooth 711 may also be designed as rectangular, wave-shape or branch-shape. The mutual-capacitance signal for touch detection may be promoted by providing the tooth 711, thereby increasing the signal-noise ratio of the in-cell touch device. In addition, although it is not shown in FIG. 7, a virtual electrode can also be disposed in the touch pattern structure of the embodiment. The virtual electrode can be designed to be located between the driving line 8 and the sensing line 7.

It should be noted that, in the embodiments of the invention described above, both the driving line and the sensing line may be made of transparent conductive material. The transparent conductive material may be indium tin oxide, indium zinc oxide, or a combination thereof.

Individual parts of the specification are described in a progressive way, with the emphasis of each of the parts on the difference between it and the other parts; hence, for the same or similar part, one can typically refer to the other parts.

The described above is only the specific embodiments of the invention, and its purpose is to make those skilled in the art can better understand the spirit of the invention. However, the scope of protection of the invention is not limited to the specific descriptions of the specific embodiments described above, and those skilled in the art can make modifications to the specific embodiments of the invention in the spirit of the invention, without departing from the scope of protection of the invention.

What is claimed is:

1. A touch pattern structure of an in-cell capacitive touch screen, comprising:
    a plurality of driving lines in a first direction, wherein the plurality of driving lines is disposed in a first layer and insulated from each other;
    a plurality of sensing lines in a second direction, wherein the plurality of sensing lines is disposed in the first layer and insulated from each other, wherein the plurality of sensing lines intersects the plurality of driving lines;
    an insulating layer displaced on the first layer; and
    a plurality of conductive bridges disposed on the insulating layer, each having two ends connecting two of the plurality of sensing lines at intercepting locations, wherein the plurality of conductive bridges is insulated from the driving lines;
    wherein the touch pattern structure is integrated in a display panel of the in-cell capacitive touch screen;
    wherein each driving electrode and each sensing electrode comprise teeth at least on one side, wherein the teeth of the driving electrodes interweave with the teeth of an opposing sensing electrode to form an intertwined structure;
    wherein a pair of the interwoven teeth defines a repeating unit; and
    wherein in a case each tooth is rectangular and the sensing electrode excluding the teeth is rectangular, a number of the teeth in the sensing electrode is greater than a value of L*(Y−2A)/A*B, where Y is a width of the rectangular-shaped sensing electrode body, A is a width and B is a depth of the rectangular-shaped tooth and L is a length of a long side, of one of the plurality of driving electrodes.

2. The touch pattern structure according to claim 1, wherein the mutually-embedded structure has at least three repeating units.

3. The touch pattern structure according to claim 1, the value of (Sd×Ss)/L is smaller with the teeth at the side of sensing lines than without teeth, where Ss is the area of a sensing electrode, Sd is the area of the driving electrode, L is the length of the side, opposing the sensing electrode, of the driving electrode.

4. The touch pattern structure according to claim 1, wherein in a case that each tooth of the sensing electrode substantially is triangular, the width of the electrode body of the sensing electrode is Z, a length of a bottom side of each triangular tooth is C and a height of the triangular tooth is D, and wherein C=0.2 mm and Z=0.4 mm, and D has an optimal value of 0.8 mm.

5. The touch pattern structure according to claim 1, wherein in a case that the sensing electrode excluding the teeth is a branch-shaped electrode body, and a width of each electrode branch is greater than 0.2 mm.

6. The touch pattern structure according to claim 2, wherein a virtual electrode is provided between one of the driving Wind lines and its corresponding sensing line, and wherein the virtual electrode is insulated from both of the driving line and the sensing line.

7. The touch pattern structure according to claim 6, wherein the driving line and the sensing electrode are covered by an insulating layer, wherein the sensing line comprises a conducting wire, wherein the conducting wire crosses the insulating layer to connect the sensing electrode, and wherein the virtual electrode is disposed between the driving electrode and the sensing electrode.

8. The touch pattern structure according to claim 6, wherein the driving line and the sensing line are respectively located on the upper side and the lower side of the insulating layer, and wherein the virtual electrode is disposed on the regions in the upper side and the lower side of the insulating layer excluding the driving line and the sensing line.

9. The touch pattern structure according to claim 6, wherein the geometry of the virtual electrode is polygon, circle or oval.

10. The touch pattern structure according to claim 7, wherein the geometry of the virtual electrode is polygon, circle or oval.

11. The touch pattern structure according to claim 8, wherein the geometry of the virtual electrode is polygon, circle or oval.

12. The touch pattern structure according to claim 1, wherein each of the driving line or the sensing line comprises at least one of a transparent conductive material, and a metal grid covered with black matrix.

13. The touch pattern structure according to claim 10, wherein the transparent conductive material comprises at least one of indium tin oxide, and indium zinc oxide.

* * * * *

UNITED STATES PATENT AND TRADEMARK OFFICE
CERTIFICATE OF CORRECTION

| | |
|---|---|
| PATENT NO. | : 9,703,426 B2 |
| APPLICATION NO. | : 14/084546 |
| DATED | : July 11, 2017 |
| INVENTOR(S) | : Qijun Yao and Lihua Wang |

It is certified that error appears in the above-identified patent and that said Letters Patent is hereby corrected as shown below:

Claim 6, Line 28:
Delete "Wind lines" and insert --lines--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*